No. 757,950. PATENTED APR. 19, 1904.
J. J. McELWAIN & E. A. YOUNG.
DRILLING AND AUTOMATIC CENTERING DEVICE.
APPLICATION FILED NOV. 18, 1903.
NO MODEL.
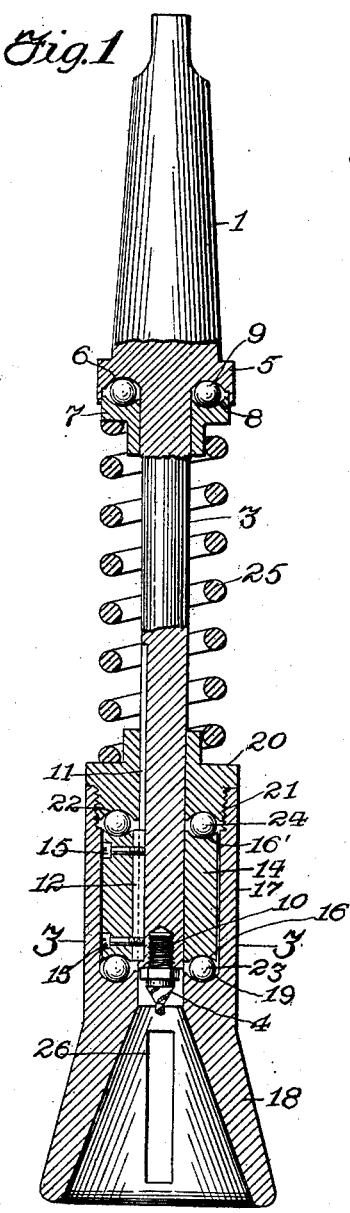
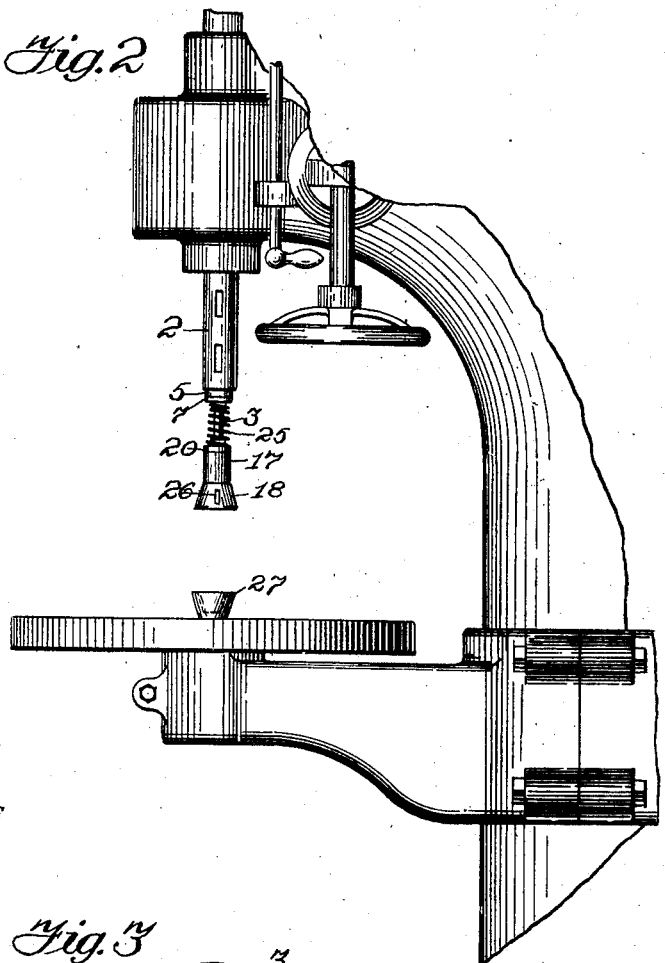
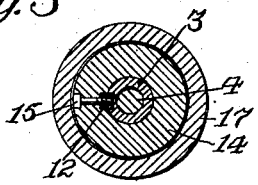
Witnesses:
Geo. B. Rowley
E. E. Potter
Inventors:
James J. McElwain
Elmer A. Young
By
Attorneys No. 757,950. Patented April 19, 1904.

UNITED STATES PATENT OFFICE.

JAMES J. McELWAIN AND ELMER A. YOUNG, OF ALLEGHENY, PENNSYLVANIA.

DRILLING AND AUTOMATIC CENTERING DEVICE.

SPECIFICATION forming part of Letters Patent No. 757,950, dated April 19, 1904.

Application filed November 18, 1903. Serial No. 181,631. (No model.)

*To all whom it may concern:*

Be it known that we, JAMES J. McELWAIN and ELMER A. YOUNG, citizens of the United States of America, residing at Allegheny, in the county of Allegheny and State of Pennsylvania, have invented certain new and useful Improvements in Drilling and Automatic Centering Devices, of which the following is a specification, reference being had therein to the accompanying drawings.

This invention relates to certain new and useful improvements in a drilling and automatic centering tool, and relates more particularly to a tool which is adapted to automatically center and drill the end of the piece of work, the same being designed to be used in a drill-press, lathe, or other similar machines.

The object of this invention is to provide a tool whereby the piece of work may be automatically centered and then drilled at its central point.

A further object of this invention is to so construct a tool that the center of an irregular-shaped piece of work—*i. e.*, the point most commonly central to its different radial peripheral irregularities—may be suitably drilled, whereby the same may be held in the lathe or other tool in which the piece of work is to be machined.

A still further object of this invention is to so construct a tool that the friction of operation of the same will be minimized and that an efficient and simple device may be produced.

With the above and other objects in view the invention consists in the novel construction, combination, and arrangement of parts, to be hereinafter more fully described, and specifically pointed out in the claims.

In describing the invention in detail reference is had to the accompanying drawings, forming a part of this application, and wherein like numerals of reference indicate like parts throughout the several views, in which—

Figure 1 is an elevation, partly in section, of our improved device. Fig. 2 is a fragmentary view of a drill-press, showing our improved tool applied thereto. Fig. 3 is a sectional view taken on line 3 3 of Fig. 1.

Referring to the drawings, the reference-numeral 1 indicates a portion of the drill-spindle which is adapted to be fitted into the spindle 2 of the drill-press or lathe, and 3 indicates an extension of the portion 1, in the outer end of which the drill 4 is mounted. The portion 5 of the drill-spindle has provided on its face a ball-race 6 and a sleeve 7, which is slidably mounted on the portion 3 of the spindle and is provided in its face with a ball-race 8, and balls 9 are mounted between the part 5 and sleeve 7, as clearly indicated in Fig. 1.

Secured in the end of the spindle 3 by the screw-threaded connection 10 is a drill 4, which is preferably formed out of hexagon stock, whereby the same may be secured in place by a socket-wrench, and formed in the portion 3 of the spindle is a way 11, in which a feather or key 12, secured within the sleeve 14 by screws 15, is adapted to slide. The ends of this sleeve 14 are provided with ball-races 16 and 16', and while the said sleeve has a nice fit over spindle 3 it is somewhat loosely mounted within the portion 17 of the centering-bell 18. The ball-race 19 is formed in the cone 18, as shown in Fig. 1, and the cap 20 is adapted to be connected to the portion 17 of the centering-bell by the screw-threaded connection 21 thereof and has a ball-race 22 provided on its under side, and a series of balls 23 are placed between the ball-race 16 and the sleeve 14, and balls 24 are placed between the ball-race 16' in the sleeve and the ball-race of the cap 20. A spring 25 is mounted between the sleeve 7 and the cap 20, whereby the said centering-bell is normally held in its lowered position. A sight 26 is provided, which consists in cutting away a portion of the bell, whereby the operation of the drill 4 upon the piece of work which has been centered in the said bell may be observed by the operator.

In assembling our device the sleeve 7 is placed in position on the spindle 3 and the balls 9 placed between the race in the sleeve and the race in the portion 5 of the spindle, and a spring 25 is then placed in position on the spindle and the cap 20 placed on said spindle. The key 12 is then placed in position in the slot 11 of the spindle and the sleeve 14 slid over the said key and spindle to such a position that the screws 15 may be placed in position whereby to connect the said key with the sleeve. The spring is then compressed by forcing the sleeve on the outer ends of the spindle upwardly and the balls 19 placed in position within the centering-bell, which is then placed in position over the sleeve. The balls 24 are then placed in position between the cap and the sleeve, and the said cap is then screwed into the upper portion of the centering-bell. The bell is then forced rearwardly and the drill 4 placed in position in the end of the spindle by a suitable socket-wrench. The device is then in condition for operation, which will be as follows: The portion 1 of the spindle having been suitably secured in the spindle 2 of the drill-press, lathe, or similar machine, the piece of work which is to be centered and drilled has its one end placed in the centering-bell 27 or otherwise held, and the spindle 2 is then operated, whereby to bring the centering-bell 18 against the other end of the work, thereby accurately centering the same, and further movement of the spindle 2, which would now be rotating, would cause spindle to move through sleeve 14 in centering-bell, whereby the spring 25 will be compressed and the drill 4 thus brought into operative relation to the piece of work, whereby the center of the same will be suitably drilled. This movement of the spindle 3 through the centering-bell is permitted by the sleeve 14 being permitted by keyway or feather 12 to slide in the slot 11, formed in the spindle 3, the said sleeve 14 of course turning with said spindle, due to this feather connection, and the friction of the under thrust of the same being minimized by the ball-bearings, which are provided, as herein described.

While we have herein shown and described the invention in detail, it will be observed that various slight changes may be made in the details of construction without departing from the general spirit of our invention.

Having fully described our invention, what we claim as new, and desire to secure by Letters Patent, is—

1. The combination of a rotary spindle having a tool-socket and enlarged portion or shoulder, a sleeve bearing against said shoulder, a bell, arranged on said spindle and formed with a central cavity, a cap screwing into said cavity, a spring bearing against said cap and sleeve and a second sleeve arranged in the cavity in the bell and slidably keyed to said spindle, substantially as described.

2. In a device of the character described, the combination of a centering-bell, a sleeve rotatably mounted in said bell, ball-bearings formed between each end of said sleeve and bell, a drill-spindle upon which said sleeve and bell are mounted, a sleeve mounted on the upper portion of said spindle, ball-bearings mounted between said sleeve and upper portion of the spindle, and a spring mounted between said last-mentioned sleeve and said bell, substantially as described.

3. In a device of the character described, the combination of a centering-bell, a sleeve rotatably mounted in said bell, a spindle slidably mounted within said sleeve by a feather connection, ball-bearings formed between each end of said sleeve and said bell, a sleeve mounted on the said drill-spindle intermediate its length, a ball-bearing formed between the upper portion of said spindle and said sleeve, a spring mounted between said last-mentioned sleeve and said bell whereby the spindle is normally held in the inoperative position within said bell, said spring providing yielding means whereby a drill in the spindle may be brought into operative relation with the piece of work, substantially as described.

In testimony whereof we affix our signatures in the presence of two witnesses.

JAMES J. McELWAIN.
ELMER A. YOUNG.

Witnesses:
A. M. WILSON,
E. E. POTTER.